No. 678,436. Patented July 16, 1901.
D. P. PERRY.
STORAGE BATTERY.
(Application filed May 7, 1900.)
(No Model.)
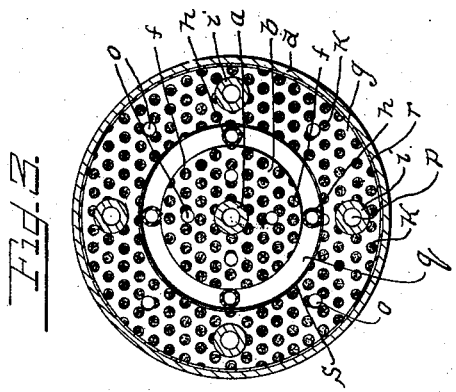
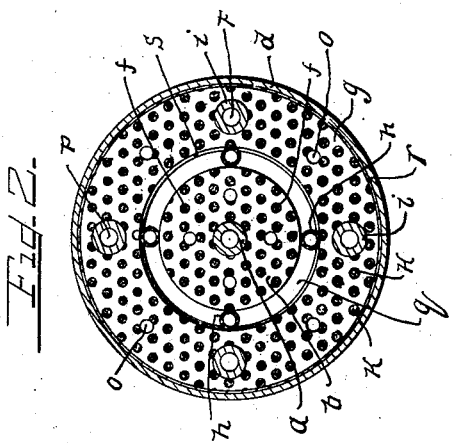
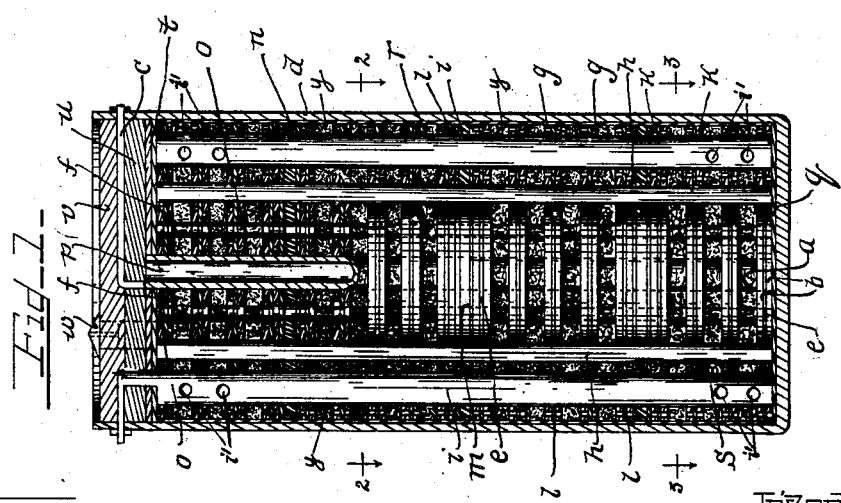
Witnesses
Inventor
David P. Perry
By Charles A. Brown + Cragg
Attorneys

UNITED STATES PATENT OFFICE.

DAVID P. PERRY, OF CHICAGO, ILLINOIS.

STORAGE BATTERY.

SPECIFICATION forming part of Letters Patent No. 678,436, dated July 16, 1901.

Application filed May 7, 1900. Serial No. 15,822. (No model.)

*To all whom it may concern:*

Be it known that I, DAVID P. PERRY, a citizen of the United States, residing at Chicago, in the county of Cook and State of Illinois, have invented a certain new and useful Improvement in Storage Batteries, (Case No. 3,) of which the following is a full, clear, concise, and exact description, reference being had to the accompanying drawings, forming a part of this specification.

My invention relates to storage batteries, and particularly to portable storage batteries, and has for its object to increase the weight efficiency thereof. This I accomplish by subdividing the plates and introducing between the subdivided portions of the plates a non-conducting porous material having intimate contact with the subdivided portions of the plate, the interposed porous material being preferably asbestos. The subdivided portions of the plates that are thus in intimate contact with the interposed porous material are practically mechanically integral in that the interposed porous material serves in conjunction with these portions to prevent the plates from buckling. Electrically the porous material serves to conduct acid to the inner faces of the plate portions engaged by the said porous material, so that each plate not only has its outer faces subject directly to the action of the electrolyte, but also has the central portion thereof subject to this action. These battery-plates thus formed in subdivided portions, between which porous non-conducting material is placed, are preferably of circular contour, the positive element being preferably composed of a plurality of disk plates, constructed as herein specified, with suitable spaces intervening between the same that are filled with active material, preferably the red oxid of lead, these disk plates being preferably coaxially arranged about a central conductor of lead, preferably of large cross-section and hollow. The negative element is preferably made of disk plates, constructed as specified, coaxially arranged and surrounding the positive element. The negative element is likewise provided, preferably, with a hollow lead terminal rod, and also with additional binding-rods. The hollow lead rods passing through the positive and negative terminals serve to convey the circulating acid, thereby counteracting excessive heat in these plates due to excessive current discharges. The plates of the battery elements are perforated to hold the active material in place.

Hitherto it has been the general practice to remove the battery elements a slight distance from the bottom of the containing vessel to prevent the active material that may become dislodged and fall to the bottom from short-circuiting the elements. To this end I provide a sheath of non-conducting material that preferably is snugly engaged with one of the elements, the active material that may fall between this sheath and the other element being thereby prevented from short-circuiting the elements.

I will explain my invention more particularly by reference to the accompanying drawings, in which—

Figure 1 is a vertical sectional view of a battery equipped in accordance with my invention. Fig. 2 is a sectional plan view on line 2 2 of Fig. 1. Fig. 3 is a sectional plan view on line 3 3 of Fig. 1.

Like parts are indicated by similar characters of reference throughout the different figures.

The positive element of the battery is preferably made up of a central terminal tube $a$, which is preferably hollow and composed of lead, disks $b\ b$ being burned to the hollow terminal tube. The disks $b\ b$ are desirably dish-shaped—that is to say, made lowest at their centers and inclined upwardly toward their outer edges. The terminal tube is provided with a leaf extension $c$, that projects through the casing $d$. The plate portions $b\ b$ are grouped in pairs about the terminal tube $a$, the disks $b$ of each pair being separated by a disk of porous non-conducting material $e$. Each pair of disks $b$, with the interposed layer of porous non-conducting material, forms a plate of the positive element. Spaces are provided between these plates in which active material $y$, such as the red oxid of lead, is disposed. The disks $b\ b$ are provided with openings $f\ f$ therethrough for holding the active material. The interposed layers of non-conducting material, preferably asbestos, are in contact with acid at their peripheries, thus conveying acid between the plates separated by the layers. The negative element is preferably similarly constructed, coaxially-arranged rings g g preferably surrounding the positive element and being metallically separated therefrom, preferably by hollow tubes h h. The rings of the negative element are preferably burned to hollow rods or tubes i i, constructed, preferably, of lead, these tubes also serving to convey acid to cool the battery and being to such end provided at their opposite ends with perforations i' i'. The rings g g are also provided with openings k k therethrough for holding the active material. Layers l l of porous non-conducting material, preferably asbestos, are interposed between the members of each pair of rings, these layers of asbestos being exposed at their peripheries to acid, the layers of asbestos serving to convey the acid to the opposed faces of the ring-plates. The pairs of rings are separated, suitable active material being confined in the spaces between the pairs.

In order that the battery elements may be rigid, I preferably provide layers of hard rubber m n, arranged transversely across the battery, the layers m of the positive element being circular and equal in diameter to the plates of the positive element, while the layers n of the negative element are ring-shaped and equal in diameter to the ring-plates of the negative element. Holes o o, extending lengthwise of the battery, are provided through the plates of both battery elements and extend through the active portion of the battery and serve to convey acid to the plates of the battery elements and the active material.

In order that the acid may circulate, I preferably provide holes p p in the leaden tubes of the battery, a layer of asbestos q being preferably provided upon the bottom of the casing d, this layer of porous fluid-conducting material serving to convey the acid from part to part of the battery. The inner vertical wall of the casing d is also preferably lined with asbestos r to conduct the acid and with the bottom lining q serves to secure the battery firmly in place within its casing. I thus minimize space that is required to contain the electrolyte, as the fluid-conducting material surrounding and placed beneath the battery elements serves to conduct the electrolyte to active material, it being necessary to surround this active material by a large body of the electrolyte. The casing d may be constructed of pasteboard, rubber, or other suitable material.

A sheath s is provided, preferably, along the interior periphery of the negative element, being preferably composed of a thin sheet of rubber or celluloid, forming a cup-shaped chamber for receiving active material that may be dislodged, whereby this active material is prevented from short-circuiting the battery elements. I thus am enabled to place the battery elements close to the bottom, whereby space is economized.

After the battery parts that I have herein described are assembled within the casing layers t of asbestos may be superposed upon the battery parts and a layer of hard rubber u upon the asbestos, after which a layer of wax v may serve to seal the battery elements within the casing, the wax serving to inclose the terminals and to prevent the acid from creeping. A plug w of rubber is provided to partially close a passage extending through the top of the battery, this plug being provided with a central vent-opening to permit gas to escape therefrom. Upon a removal of the plug acid may be poured into the battery, the vent-hole being sufficiently small to prevent the acid from creeping through the same. This passage in the cover of the battery is preferably in direct communication with the annular space between the positive and negative elements. I do not wish to be limited to the use of any active material or electrolyte that may be employed.

While I have herein shown and particularly described the preferred embodiment of my invention, it is obvious that changes may be made without departing from the spirit thereof, and I therefore do not wish to be limited to the precise construction shown; but,

Having thus described my invention, I claim as new, and desire to secure by Letters Patent, the following:

1. A battery having an element consisting of a series of disk or plate like members arranged side by side, a conductor extending transversely through said members and secured thereto, active material between each pair of members, and absorbent material between the members of each pair, substantially as described.

2. In a storage battery, the combination with an inner element consisting of electro-conductive plates or members and active material in contact with said plates, of an outer element inclosing the inner element, and a sheath of non-conducting material surrounding the lower end of the inner element, substantially as described.

3. In a storage battery, the combination with a battery element comprising disk-like members arranged in groups, porous non-conducting material interposed between and next to the disk-like members of each group, the said groups being separated, and active material provided between the groups, of a second battery element inclosing the first aforesaid battery element comprising members in the form of rings divided into groups, porous non-conducting material interposed between and next to the said members of each group, the said groups being separated, and active material provided between the groups, substantially as described.

4. In a storage battery, the combination with a battery element comprising disk-like members arranged in groups, porous non-conducting material interposed between and arranged next to the disk-like members of each group, the said groups being separated, and active material provided between the groups, of a second battery element inclosing the first aforesaid battery element comprising members in the form of rings divided into groups, porous non-conducting material interposed between and arranged next to the said members of each group, the said groups being separated, active material provided between the groups, and openings or passages provided through the elements of the battery for conveying electrolyte, substantially as described.

5. In a storage battery, the combination with a battery element comprising disk-like plate portions arranged in groups, porous non-conducting material interposed between the disk-like plate portions of each group, the said groups being separated, and active material provided between the groups, of a second battery element inclosing the first aforesaid battery element comprising plate portions in the form of rings divided into groups, porous non-conducting material interposed between the said plate portions of each group, the said groups being separated, active material provided between the groups, and tubes of electroconductive material for the said elements, forming binding and terminal tubes, serving to convey the electrolyte, substantially as described.

6. In a storage battery, the combination with a battery element comprising disk-like plate portions arranged in groups, porous non-conducting material interposed between the disk-like plate portions of each group, the said groups being separated, and active material provided between the groups, of a second battery element inclosing the first aforesaid battery element comprising plate portions in the form of rings divided into groups, porous non-conducting material interposed between the said plate portions of each group, the said groups being separated, active material provided between the groups, and a sheath of non-conductive material surrounding the lower end of the inner element, serving to form a receptacle for loosened active material, whereby short-circuiting of the battery elements is prevented, substantially as described.

7. In a storage battery, the combination with a battery element comprising disk-like plate portions arranged in groups, porous non-conducting material interposed between the disk-like plate portions of each group, the said groups being separated, and active material provided between the groups, of a second battery element inclosing the first aforesaid battery element comprising plate portions in the form of rings divided into groups, porous non-conducting material interposed between the said plate portions of each group, the said groups being separated, active material provided between the groups, and openings extending through the plates and active material of the battery elements for conveying electrolyte, substantially as described.

8. In a storage battery, the combination with a battery element comprising disk-like plate portions arranged in groups, porous non-conducting material interposed between the disk-like plate portions of each group, the said groups being separated, and active material provided between the groups, of a second battery element inclosing the first aforesaid battery element comprising plate portions in the form of rings divided into groups, porous non-conducting material interposed between the said plate portions of each group, the said groups being separated, active material provided between the groups, and rigid layers $m$, $n$, dividing the battery elements into sections and serving to make the same rigid, substantially as described.

9. In a storage battery, the combination with superposed battery-plates, of active material interposed between the same, and a hollow binding-tube of electroconductive material serving to join the battery-plates and serving to convey electrolyte from part to part of the battery, substantially as described.

10. In a storage battery, the combination with superposed plates, of active material interposed between the same, and a hollow binding-tube of electroconductive material serving to join the battery-plates and serving to convey electrolyte from part to part of the battery, the said hollow tube also constituting a terminal of the battery elements, substantially as described.

In witness whereof I hereunto subscribe my name this 2d day of May, A. D. 1900.

DAVID P. PERRY.

Witnesses:
MAX W. ZABEL,
GEORGE L. CRAGG.